United States Patent [19]
Barbour et al.

[11] Patent Number: 5,193,157
[45] Date of Patent: Mar. 9, 1993

[54] PIPLINED SYSTEM INCLUDES A SELECTOR FOR LOADING CONDITION CODE EITHER FROM FIRST OR SECOND CONDITION CODE REGISTERS TO PROGRAM COUNTER

[75] Inventors: Russell G. Barbour, Framingham; Carl A. Soeder, Boxborough, both of Mass.; Stephen J. Ciavaglia, Nashua, N.H.

[73] Assignee: Hewlett-Packard Company, Palo Alto, Calif.

[21] Appl. No.: 769,165

[22] Filed: Sep. 27, 1991

Related U.S. Application Data

[63] Continuation of Ser. No. 259,345, Oct. 18, 1988, abandoned.

[51] Int. Cl.$^5$ ............................................. G06F 9/38
[52] U.S. Cl. ............................. 395/375; 364/DIG. 1; 364/247; 364/247.3; 364/231.8; 364/238; 395/800
[58] Field of Search ... 364/200 MS File, 900 MS File; 395/375, 800

[56] References Cited

U.S. PATENT DOCUMENTS

| | | | |
|---|---|---|---|
| 3,881,173 | 4/1975 | Larsen et al. | 340/172.5 |
| 4,378,589 | 3/1983 | Finnegan et al. | 364/200 |
| 4,484,303 | 11/1984 | Provanzano et al. | 364/900 |
| 4,578,750 | 3/1986 | Amdahl et al. | 364/200 |
| 4,742,453 | 5/1988 | Shibuya | 364/200 |
| 4,764,861 | 8/1988 | Shibuya | 364/200 |
| 4,777,587 | 10/1988 | Case et al. | 364/200 |
| 4,791,551 | 12/1988 | Garde | 364/200 |
| 4,794,521 | 12/1988 | Ziegler et al. | 364/200 |
| 4,811,211 | 3/1989 | Sandman et al. | 364/200 |
| 4,845,659 | 7/1989 | Hrusecky | 364/900 |
| 4,881,194 | 11/1989 | Sprague et al. | 364/900 |
| 4,914,581 | 4/1990 | Talgam et al. | 364/200 |
| 4,933,897 | 6/1990 | Shankar et al. | 364/900 |
| 4,967,351 | 10/1990 | Zmyslowski et al. | 364/200 |
| 5,027,315 | 6/1991 | Agrawal et al. | 395/275 |

FOREIGN PATENT DOCUMENTS 0365187  4/1990  European Pat. Off. .

OTHER PUBLICATIONS

DeRosa, John and Levy, Henry, "An Evaluation of Branch Architectures," *The 14th Annual International Syumposium on Computer Architecture*, Jun. 1987, Pittsburgh, Pa., pp. 10–16.

McFarling, S. and Hennessy, J., "Reducing the Cost of Branches," *The 13th Annual International Symposium on Computer Architecture*, Jun. 1986, Tokyo, Japan, pp. 396–403.

"Multiple Queued Condition Codes," *IBM Technical Disclosure Bulletin*, vol. 31, No. 2, Jul. 1988, Armonk, N.Y., pp. 294–296.

Rosocha, W. G., and Lee, E. S., "Performance Enhancement of SISD Processors," *The 6th Annual International Symposium on Computer Architecture*, Apr. 1979, Toronto, Canada, pp. 216–231.

Primary Examiner—Thomas C. Lee
Assistant Examiner—Mehmet Geckil

[57]  ABSTRACT

A method and apparatus is disclosed for control of a central processor in response to a branch instruction using two separate, subsequently updated condition codes. Computer architecture is provided wherein the condition codes which determine the processor state result from the execution of instructions prior to the currently executing instruction. When the preceding instructions are executed, condition codes are set and maintained in a first condition code register. The first condition code is transferred to the second condition code register, and the first condition code register is updated to reflect the result of the current instruction execution. Any condition code state such as a branch used by the third instruction is based on the condition code state maintained in the second condition code register.

3 Claims, 3 Drawing Sheets

PIPLINED SYSTEM INCLUDES A SELECTOR FOR LOADING CONDITION CODE EITHER FROM FIRST OR SECOND CONDITION CODE REGISTERS TO PROGRAM COUNTER

This application is a continuation of application Ser. No. 07/259,345, filed Oct. 18, 1988 now abandoned.

FIELD OF THE INVENTION

The present invention relates to computer instruction execution and compiling systems, and in particular to computer processor and compiling system techniques which relate to the latency instructions occurring between the establishment of a condition code state and the execution of the subsequent condition code dependant instruction.

BACKGROUND OF THE INVENTION

In computer architectures, the result of an execution of a given instruction causes the processor to maintain a particular state. A summary of the result of a given operation is stored as a condition code, and the state is referred to as a condition code state. Changes in program flow, such as caused by a conditional branch, are achieved by testing and branching on a particular condition code state. However, many computer systems suffer a settling delay between the setting of the condition codes to the use of those condition codes by a conditional branch instruction. In some computer systems, time is wasted by either increasing the machine's cycle time or the injection of a system stall. Either approach requires the branch instruction to wait for the condition codes to stabilize reducing system performance. Pipeline processors have instructions which are partitioned into several cycles of execution, each cycle of which is completed at different and sequential time periods, and have the cycles of the instruction partially overlapping to allow the most efficient execution of all such pipelined instructions. Pipeline processors are particularly penalized when the program flow is altered by a branch instruction. As a technique to reduce this penalty, the step of branching on condition code state by instruction (i+1) is overlapped with the step of instruction execution by the prior instruction, i. However, this action leads to a condition code settling delay of one cycle in that instruction (i+1) not alter condition code state while the condition codes becomes stable for use in instruction i+2. Condition code settling imposes the restriction that there is a single instruction delay (referred to as the later instruction) between an instruction which alters condition code state relative to an instruction which uses that updated state. This restriction restrains the compiler from assigning instructions as latency instructions. As a result, processor performance is reduced since useful latency instructions cannot be assigned.

SUMMARY OF THE INVENTION

The present invention provides an apparatus and method to maintain two sets of condition codes which allow the compiler to assign any instruction as a latency instruction, filling the intervening latency time periods with instructions which may set or use condition codes, thereby providing the maximum improvement in processor performance with pipelined instructions.

In the particular embodiment of the invention discussed herein, it is assumed, that the number of latency instructions is 1. According to the present invention, the architecture supports two sets of condition codes referred to as Current cc and Next cc. The same state variables are represented in both sets of condition codes. All branching is relative to the condition codes held in Current cc. The Current cc is always updated from Next cc, which may be updated from the executing instruction at the option of that instruction. As the execution of instruction i is completed, the state maintained in Next cc is transferred to Current cc, and the state maintained in Next cc is selectively updated to reflect current instruction execution. If an instruction does not then alter the condition code, Next cc remains unchanged, forcing the current cc state to be equal to the Next cc state. As the latency instruction, or subsequent instruction i+1 completes, the state maintained in Next cc is transferred to Current cc, and again the state maintained in Next cc is updated to reflect the present executing instruction. If the next, or third instruction, (i+2) is a branch or other instruction causing non-sequential instruction execution, this branch is based on the condition codes maintained in Current cc.

Therefore, the apparatus and method of the present invention provides increased efficiency wherein the pipeline processor altered state by instruction i, may also be altered by the latency instruction i+1, affecting the execution of instruction i+2 and i+3 respectively, if such instructions are condition code state dependant, resulting in enhanced system performance by making the otherwise useless latency instructions available for a larger set of operations.

BRIEF DESCRIPTION OF THE DRAWING

These and other features according to the present invention will be better understood by reading the following detailed description, taken together with the drawing wherein.

DETAILED DESCRIPTION OF THE INVENTION

The system according to the present invention provides a pipeline structure for one or both integer and floating point condition codes. The branch operation predicate is partitioned into integer and floating point branch condition portions. In the particular embodiment shown, the integer processor is responsible for interpreting both integer and floating point branch predicates and generates the integer condition codes external to the Integer Processor. A copy of this maintained state is sent and held in the Integer Processor.

Figure 1:
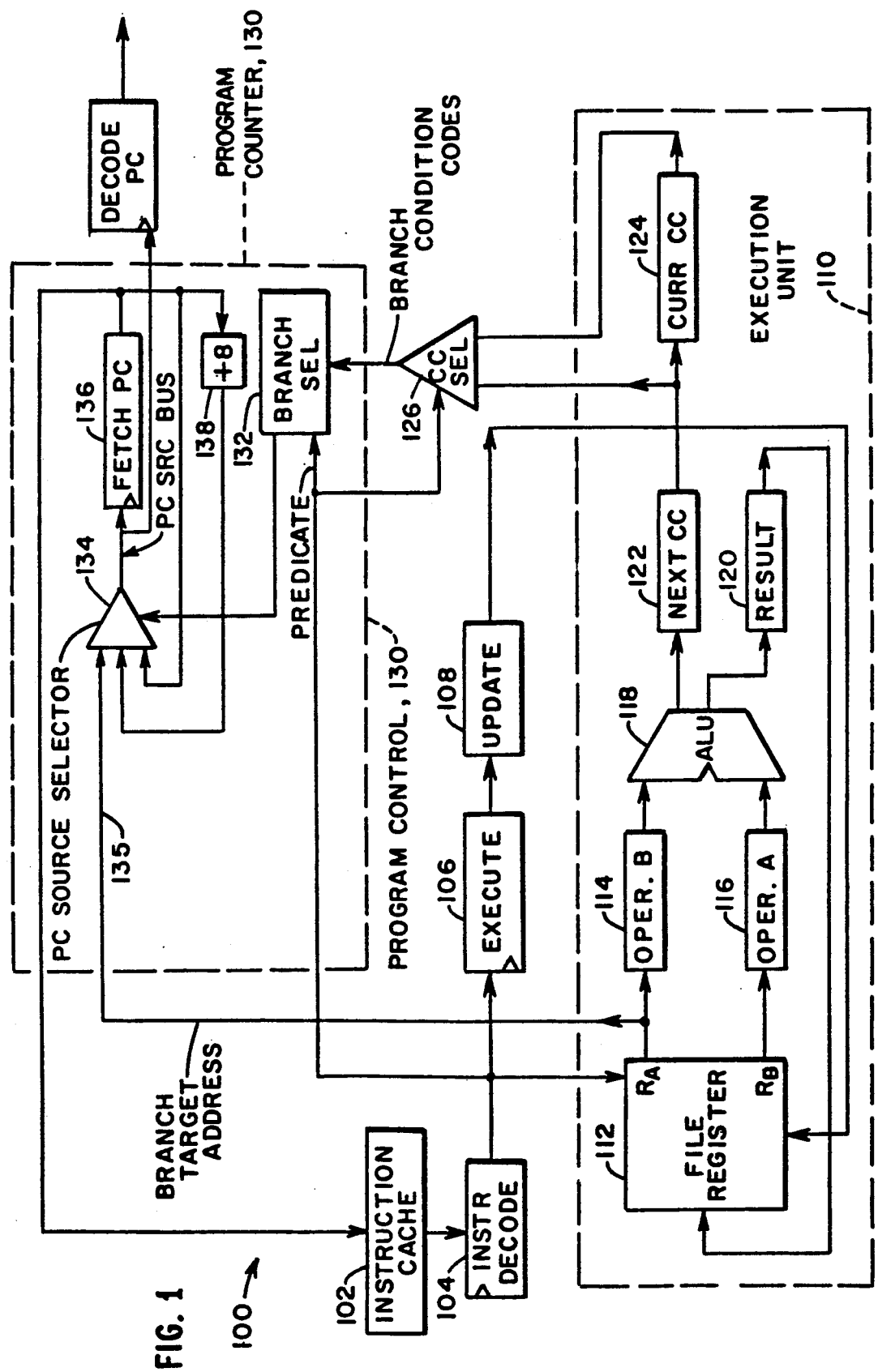
FIG. 1 is a block diagram of one embodiment of the apparatus according to the present invention.

The instructions received by the processor in FIG. 1 are provided by an instruction cache 102 during the Instruction Fetch (IF) period to the instruction decode register 104 in response to the cache address signal program counter source, PC SRC, provided by a program counter 130. The File Register 112 of the Execution Unit 110 receives the instruction from the instruction decode register 104 and provides Operand A and Operand B in response to the received instruction during the Operand Fetch (OF) period. Operands A and B are received and stored in registers 114 and 116 at substantially the same time the execute register 106 receives and stores the instruction stored in the instruction decode register 104. The Arithmetic Logic Unit (ALU) 118 processes Operands A and B, and provides result and condition code signals during the Instruction Execute (IE) period which signals are stored in registers 120 and 122 respectively. Substantially simultaneously with the storage of signals from the ALU 118 in registers 120 and 122, the instruction is stored in the update register 108. The instruction stored in the update register may be received by the File Register 112 to indicate where to store the signal now stored in the result register 120, as determined by the particular instruction executed during the Writeback Execute (WE) and data Cache (DC) period. Alternately, results may be stored during a subsequent Writeback Load (WL) period.

The program counter 130 includes branch select logic 132 which controls the operation of the PC Source Selector 134 in response to the selected condition code (126) and the instruction (104) being decoded for execution by the File register 112. The program counter register 136 can be incremented by zero are incremented by a value corresponding to the address difference (e.g., 8 provided by 138) in the next instruction in the cache 102.

Each condition code includes at least four single bit integer condition codes (cc), including zero (Z), negative (N), overflow (V), and carry (C). In the particular embodiment of the present invention, there are six floating point codes: not-a-number (NAN), zero (Z), negative (N), (i) infinity, graphic trivial accept and graphic trivial reject. The predicate field of the floating point branch will support up to 32 floating point branch types such as illustrated in copending patent application 07/259130, entitled APPARATUS FOR SELECTIVE EXECUTION OF INSTRUCTIONS FOLLOWING A BRANCH INSTRUCTION, filed concurrently herewith and assigned Ser. No. 07/259/130, incorporated by reference. The location of the condition codes in the processor status word (IPSW) is shown in table 1, below. The system according to the present invention also includes a compiler which unconditionally inserts at least one instruction between an instruction which sets condition codes and an instruction which is a branch (or other instruction causing non-sequated instruction execution) based on those condition codes to provide time for condition code settling. The inserted instruction can also set the condition codes for reference by subsequent branch (test) instructions or use the previously set condition codes. Condition Code state is maintained in a register referred to as the Integer Processor Status longword register (IPSW).

The position of condition codes in a processor status longword (IPSW) is illustrated in table 1 below.

1) Register to register instruction which sets condition codes (rr.cc) where the execution unit specifies the condition codes based on computed results.

2) Integer load instruction which sets condition codes (load.cc) where the condition codes are generated on an incoming result supplied by the data cache interface. A load.cc takes one additional cycle to generate condition codes relative to an rr.cc.

3) Move to processor register instruction which updates the condition code pipeline (mtpr.ipsw). A mtpr.ipsw takes one additional cycle to generate condition codes relative to an rr.cc.

Figure 2:
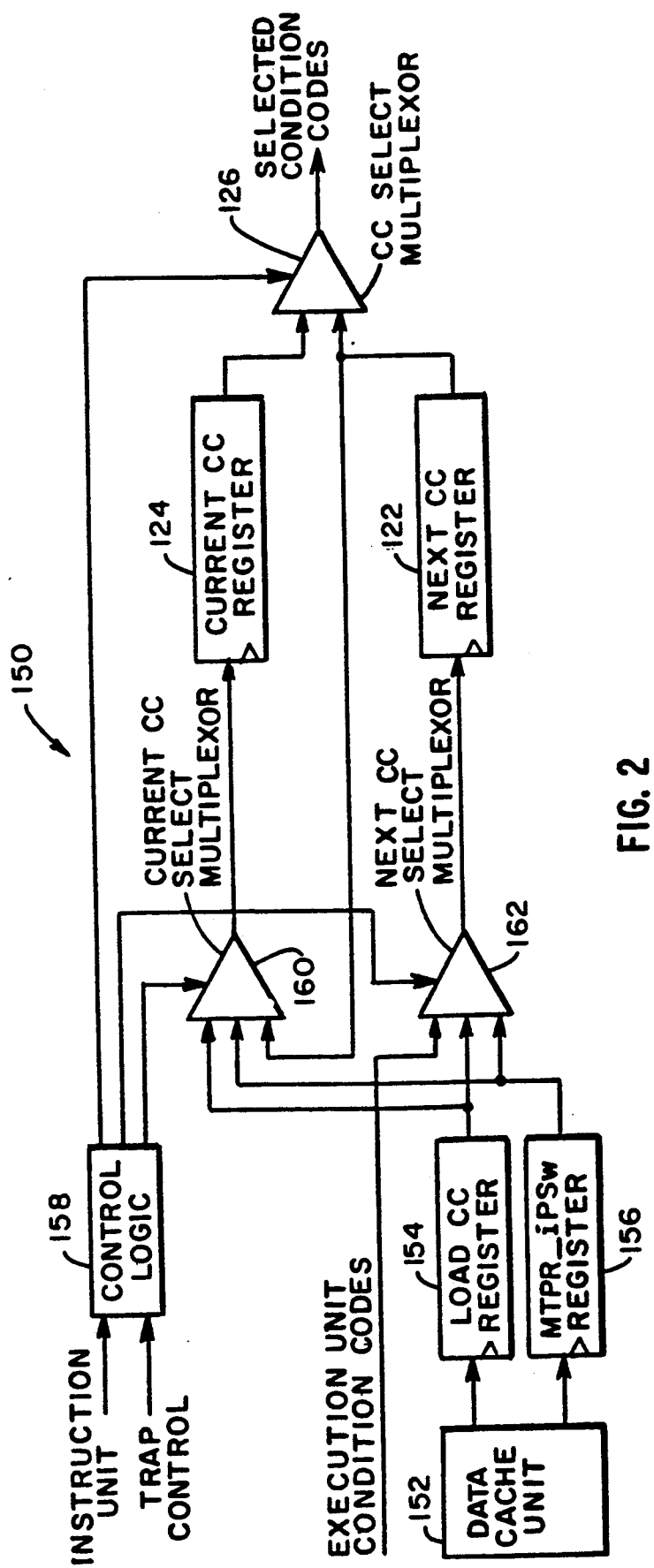
FIG. 2 is a more detailed diagram of the condition code pipeline of the embodiment of FIG. 1.
Figure 3:
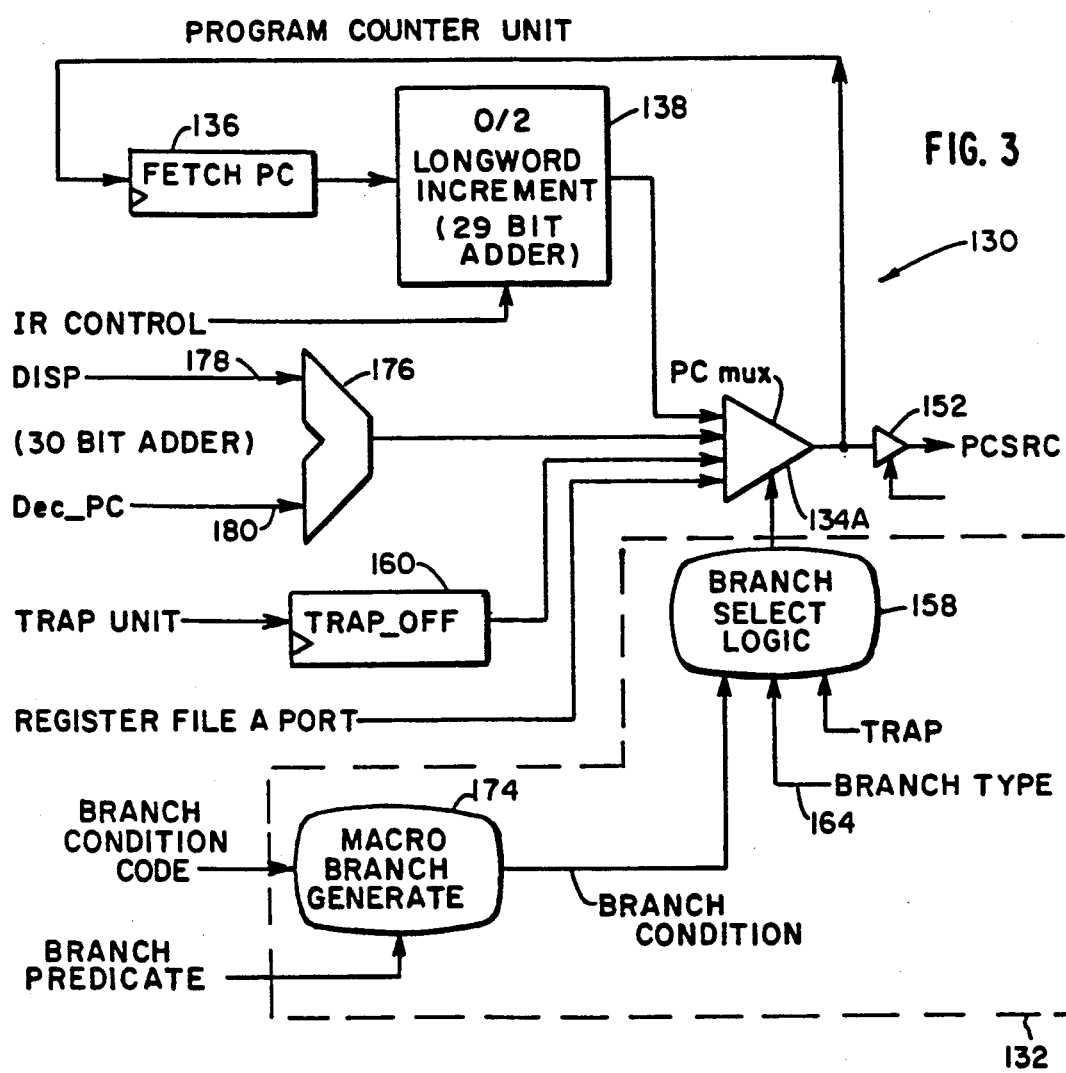
FIG. 3 is a more detailed diagram of the process control unit according to the embodiment of FIG. 1.

The condition code pipeline shown in the block diagram 150 of FIG. 2 The current cc register 124 holds the integer condition codes relative to the (last instruction-1) executed, and is sourced from the current cc select multiplexor 160. The next cc register 122 holds the integer condition codes relative to the (last instruction) executed and is sourced from the next cc select multiplexer 162. The cc select multiplexor 126 supplies the branch condition codes to the program counter unit 130 (FIG. 3) which are used to alter instruction stream direction and is selectively sourced from the current cc or next cc registers, 124 and 122. The next cc select multiplexor 162 is used to supply the source of integer condition codes to the next cc register 122 and is selectively sourced from the execution unit (110 of FIG. 1) load_cc 154 or mtpr_ipsw 156 registers. The current cc select multiplexor 160 is used to supply the source of integer condition codes to the current cc register 124 and is sourced from the next cc, load_cc or mtpr_ipsw registers, 122, 154 and 156. The load_cc register 154 holds condition code state relative to load.cc instruction execution. The mtpr_ipsw register 156 holds condition code state relative to mtpr.ipsw instruction execution. The ipsw register represents the state of the condition code pipeline (Current and Next CC Registers) and all necessary state in order to advance the pipeline relative to past instruction history.

In the description below, only one condition code update source S(execution unit, load_cc register or mtpr_ipsw register) can be injected into the condition code pipeline per machine cycle. However, other embodiments may permit multiple code update sources per machine cycle. If an rr.cc follows a load.cc or mtpr_ipsw, instruction control hardware will stall the rr.cc by one cycle forcing a null cycle in the execution unit.

For register to register instruction execution, as instructions are executed the cc select multiplexor selects the next cc register to supply the branch condition codes with the next cc register conditionally loaded into the current cc register. The next cc register is updated

TABLE 1

| IPSW FORMAT | | | | | | | | | | | | | | | | |
|---|---|---|---|---|---|---|---|---|---|---|---|---|---|---|---|---|
| 31 | 30 | 29 | 28 | 27 | 26 | 25 | 24 | 23 | 22 21 20 19 18 17 16 15 | | | | | | | 14 | 00 |
| N | Z | V | C | N | Z | V | C | | | | | | | | R | '0' |
| current | | | | next | | | | | | | | | | | | |
| | | | | | | | | cc | | | | | | | | cc |
| | | | | | | | | Z = zero | | | | | | | | (r/w) |
| | | | | | | | | V = overflow | | | | | | | | (r/w) |
| | | | | | | | | N = negative | | | | | | | | (r/w) |
| | | | | | | | | C = carry | | | | | | | | (r/w) |
| | | | | | | | | R = completed in shadow of load cc | | | | | | | | |

There are three classes to instructions which can set integer condition codes:

from the executing unit provided there is a valid instruction currently being executed which sets integer condition codes (rr.cc). If there is not, the next cc register will not be updated. The current cc register is updated from the next cc register if there is a valid instruction being executed (which may or may not be setting condition codes). All instructions are allocated a cycle to the execution unit but not all cycles are executing an instruction due to resource stalls, instruction cache misses, etc. If there is not a valid instruction in the execution unit, neither the current cc or next cc registers will be updated. The cc select multiplexer will select the next cc register.

For a load.cc instruction, the cc select multiplexor selects the next cc register to supply branch conditions, the next cc register is updated from the load_cc register and the current cc register conditionally updated from the load_cc register. Since load.cc instruction takes an additional cycle to specify cc state, an additional instruction may have been executed by the execution unit. Condition code pipeline advance is therefore a function of whether an additional instruction has been executed when the load_cc register is ready to supply condition code state via the load_cc register to the condition code pipeline. This history is maintained in the R bit of the IPSW. If an additional instruction has been executed by the execution unit (note this instruction cannot set condition codes), the current cc register is also updated from the load_cc register. The result is that both the current cc and next cc registers are updated from the load_cc register. Since two instructions have executed (the load.cc and it's shadow), the condition code pipeline must be advanced by two to reflect this once load.cc condition codes are available. If an additional instruction had not been executed, only the next cc register will be updated from the load_cc register.

For a mtpr.ipsw instruction, the cc select multiplexor selects the next cc register to supply branch conditions with the current cc and next cc registers unconditionally updated from the mtpr_ipsw register. That is the current cc register will be updated from the current cc portion of the IPSW and the next cc register will be updated from the next cc portion of the IPSW. The mtpr.ipsw instruction is used to overwrite the cc pipeline.

For the mtpr.ipsw instruction, the cc select multiplexor selects the current cc register to supply branch conditions with the current cc and next c registers unconditionally updated from the mtpr_ipsw register with IPSW state. That is the current cc register will be updated from the current cc portion of the IPSW and the next cc register will be updated from the next cc portion of the IPSW. The mtpr.ipsw instruction is used to overwrite the condition code pipeline.

At exception trap entry, the condition code pipeline will reflect the state of the last two instruction executed. If instructions i−1 and 1 are the last two instructions executed, current cc register will reflect condition code state updated by instruction i−1 and the next cc register will reflect condition code state updated by instruction 1. During return from exception, the condition code pipeline is disabled from advancing. The condition code pipeline will not advance until the first instruction after returning from the exception has reached the execution unit. This equates to the second cycle following return from exception. During the first cycle from exception return, the cc select multiplexor will select the current cc register. During the second cycle from exception return, the cc select multiplexor will select the next cc register. From the third cycle on, the cc select multiplexor will select the next cc register.

Reservation tables (Tables 2-6) depicting the above action follow.

TABLE 2

RR.cc instruction execution...

| Resource | Cycle → | | | | | | |
|---|---|---|---|---|---|---|---|
| PCSRC | i+1 | i+2 | i+3 | tar1 | tar2 | | |
| IF | 1 | i+1 | i+2 | i+3 | tar1 | tar2 | |
| OF | | i | i+1 | i+2 | i+3 | | |
| EX | | | i | i+1 | i+2 | i+3 | |
| DC | | | | | | | |
| WL | | | | | | | |
| WE | | | | i | i+1 | | |

Next CC Register ——⟨i⟩⟨i+1⟩——

Current CC Register ——⟨i⟩⟨i+1⟩——

Branch Condition Codes ——⟨i⟩⟨i+1⟩——

Code Sequence:
i: rr.cc
i+1: rr.cc
i+2: b<cond> tar1
i+3: b<cond> tar2

TABLE 3

RR/RR.cc instruction execution...

| Resource | Cycle → | | | | | | |
|---|---|---|---|---|---|---|---|
| PCSRC | i+1 | i+2 | i+3 | tar1 | tar2 | | |
| IF | 1 | i+1 | i+2 | i+3 | tar1 | tar2 | |
| OF | | i | i+1 | i+2 | i+3 | | |
| EX | | | i | i+1 | i+2 | i+3 | |
| DC | | | | | | | |
| WL | | | | | | | |
| WE | | | | i | i+1 | | |

Next CC Register ——⟨i  i⟩——

Current CC Register ——⟨i⟩⟨i⟩——

Branch Condition Codes ——⟨i⟩⟨i⟩——

Code Sequence:
i: rr.cc
i+1: rr
i+2: b<cond> tar1
i+3: b<cond> tar2

TABLE 4 load.cc instruction execution...

Resource     Cycle →

TABLE 4-continued

| PCSRC | i+1 | i+2 | i+3 |     |     | tar1 | tar2 |
|---|---|---|---|---|---|---|---|
| IF | 1 | i+1 | i+2 | i+3 | i+3 | i+3 | tar1 |
| OF |   | i | i+1 | i+2 | i+2 | i+2 | i+3 |
| EX |   |   | i | i+1 |   |   |   |
| DC |   |   |   | i |   |   |   |
| WL |   |   |   |   | i |   |   |
| WE |   |   |   |   |   | i+1 |   |

Next CC Register ⟨ i  i ⟩

Current CC Register ⟨ i  i ⟩

Branch Condition Codes ⟨ i  i ⟩

Code Sequence:
i: load.cc
i+1: rr
i+2: b<cond> tar1
i+3: b<cond> tar2

TABLE 5

Exception Action...
Trap entry    Resource    Cycle ⟶

| PCSRC | i+1 | i+2 |   |   |   |   |
|---|---|---|---|---|---|---|
| IF | 1 | i+1 | i+2 |   |   |   |
| OF |   | i | i+1 | i+2 | i+2 |   |
| EX |   |   | i | i+1 |   | trap entry |
| DC |   |   |   |   |   |   |
| WL |   |   |   |   |   |   |
| WE |   |   |   |   | i | i+1 |

Next CC Register ⟨ i ⟩ i+1 ⟩

Current CC Register ⟨ i ⟩

Branch Condition Codes ⟨ i ⟩ i+1 ⟩

Code Sequence:
i: rr.cc
i+1: rr.cc ⟵ trap here, i and i+1 complete...
i+2: b<cond> tar1
i+3: b<cond> tar2

TABLE 6

Exception Action...
Trap exit    Resource    Cycle ⟶

TABLE 6-continued

| PCSRC |  | tar1 | tar2 |  |  |
|---|---|---|---|---|---|
| IF | trap return | i+3 | tar1 | tar2 |  |
| OF |  | i+2 | i+3 |  |  |
| EX |  |  | i+2 | i+3 |  |
| DC |  |  |  |  |  |
| WL |  |  |  |  |  |
| WE |  |  |  |  |  |

Next CC Register ⟨ i+1  i+1  i+1 ⟩

Current CC Register ⟨ i  i ⟩ i+1 ⟩

Branch Condition Codes ⟨ i ⟩ i+1 ⟩ i+1 ⟩

Code Sequence:
i:
i+1: ⟵ return point...
i+2: b<cond> tar1
i+3: b<cond> tar2

Reservation table definitions are as follows.
Instruction Fetch (IF)
The instruction Fetch stage is responsible for fetching the next instruction from the instruction Cache. During this cycle the IP will be supplying the virtual PC address of the subsequent instruction to be fetched.
Operand Fetch/Instruction Decode (OF)
The Operand Fetch and Instruction Decode stage is responsible for decoding the instruction and dispatching the necessary operands and control to the Execution Unit. Integer register file operands are fetched in this stage. For macro branch instructions, this stage supplies the branch target address or next sequential address of the next instruction to be fetched.
Instruction Execute (EX)
The Instruction Execute stage is responsible for executing the instruction. For memory reference instructions, this stage computes the effective address.
Writeback Execution Result (WE)
The Writeback Execution Result stage writes the computed Execution Unit result back into the integer register file.
Data Cache Address (DE)
The Data Cache Access stage is responsible for accessing the data cache for memory reference instruction. For store operations, this stage transmits data to the Data Cache. For load operations, this stage receives data from the Data Cache. Only memory reference instructions have this stage.
Writeback Load Result (WL)
The Writeback Load Result stage is responsible for writing load data into the integer register file. Only memory reference instructions have this stage.
The instructions to be executed in the processor according to the present invention are provided from the instruction cache 102, a memory or other instruction store (not shown) according to a sequence of address signals, provided by a program counter source bus (PCSRC) 152 of the program control unit block diagram 130 of FIG. 3. The address signals on lead 152 is selectively provided by a program counter multiplexer 134A which selects the program counter signals from a variety of sources according to a control signal provided by a branch select logic element 158. When an instruction trap condition is invoked, a trap address is provided by a trap unit 160 and selected by a trap select signal 162. Similarly, branch type signals 164 cause the branch select logic 158 and the multiplexor 134A to select a signal from either Register file A Part 1 or from a 36 bit adder 176. The condition code pipeline 150 in FIG. 2 provides a branch condition code to branch generate control logic 174. The program counter multiplexer 134A selectively receives the address signal from an adder 176 which provides on address resulting from the sum of a displacement on the 178 and a decrementing program counter signal on the 180, which relates to the location of the destination of branch taken. By further example, after having taken the branch, the program counter address is stored by a fetch register 136 and conditionally incremented by an adder 138 upon receipt of an instruction register control signal to provide an incrementing program counter signal to the multiplexer 156.

Substitutions and modifications made by one of ordinary skill in the art are within the scope of the present invention. For instance, the addition of intervening steps within the process according to the present invention and the addition of registers in the instruction pipeline as illustrated in the structure according to the present invention is within the scope of the present invention. Furthermore, modification in the format of the instructions or codes described herein to provide the selective execution of branch shadow instructions is also considered to be within the scope of the present invention, which is not to be limited except by the claims which follow:

What is claimed is:

1. A computer system comprising:
   a processor;
   a first condition code register having a first port coupled to a first port of said processor;
   a second condition code register having a first port coupled to a second port of said first condition code register wherein said first condition code register is capable of holding a first condition code generated as a result of said processor executing a first instruction and wherein upon said processor executing a second instruction said first condition code is automatically transferred from said first condition code register to said second condition code register and a second condition code is automatically transferred to said first condition code register;
   a program counter unit having a first port; and
   a condition code selector, having a first port coupled to the second port of said first condition code register and a second port coupled to the second port of said second condition code register and a third port coupled to the first port of said program counter unit, for selectively providing a first one of said first and second condition codes to said program counter unit from a first one of said first and second condition code registers.

2. The computer system of claim 1 wherein said processor executes a branch instruction in response to said first condition code held in said second condition code register.

3. A method of maintaining a series of condition codes in a condition code pipeline computer having a processor in communication with a first condition code register and a second condition code register in communication with said first condition code register, said method comprising the steps of:
   a. executing a first instruction by said processor;
   b. storing, in a first condition code register, a first condition code generated as a result of said processor executing said first instruction;
   c. executing a second instruction by said processor;
   d. automatically moving the first condition code generated as a result of said processor executing said first instruction from said first condition code register into a second condition code register;
   e. storing in the first condition code register a second condition code resulting from said processor executing said second instruction; and
   f. loading a selected one of the first or second condition codes from the corresponding one of the first or second condition code registers into a program counter.

* * * * *